United States Patent [19]
Stopyra et al.

[11] Patent Number: 6,030,426
[45] Date of Patent: Feb. 29, 2000

[54] LIFTING HANDLE FOR AIR PURIFIER

[75] Inventors: Stephen Stopyra, Syracuse; Theodore S. Bolton, Liverpool, both of N.Y.

[73] Assignee: Carrier Corporation, Farmington, Conn.

[21] Appl. No.: 09/017,349

[22] Filed: Feb. 2, 1998

[51] Int. Cl.[7] .................................................. B01D 35/30
[52] U.S. Cl. .............................. 55/357; 55/471; 55/490
[58] Field of Search ........................... 55/471, 472, 467, 55/490, 495, 356, 357; 15/329, 344, 361; 190/115; 294/137; D3/364

[56] References Cited

U.S. PATENT DOCUMENTS

| D. 360,028 | 7/1995 | Matsuda | D23/364 |
| 5,511,282 | 4/1996 | Metzger et al. | 15/412 |
| 5,893,939 | 4/1999 | Rakocy et al. | 55/471 |

FOREIGN PATENT DOCUMENTS 59-217431 12/1984 Japan ..................................... 55/495

*Primary Examiner*—David A. Simmons
*Assistant Examiner*—Robert A. Hopkins
*Attorney, Agent, or Firm*—Wall Marjama Bilinski & Burr

[57] ABSTRACT

A lifting device for a portable air purifying unit that includes a rectangular main support member for supporting all the component parts of the unit so that they are balanced about the support. A housing comprising a top cover and front and rear covers is attached to the support for enclosing the unit. The top cover is coextensive with the top wall of the support and contains a raised partition that extends laterally across the cover. A hand-hold passes through the center of the partition that opens into an enclosure mounted on the cover in front of the partition. The hand-hold and the chamber combine to form a handle. The front cover of the housing passes over the handle to partially shield the handle thereunder.

10 Claims, 5 Drawing Sheets

LIFTING HANDLE FOR AIR PURIFIER

BACKGROUND OF THE INVENTION

This invention relates generally to a handle for lifting a portable air handling unit and, in particular, to a hidden carrying handle suitable for use with a portable air purification unit that is fully contained within a light-weight housing.

As the air we breathe becomes more contaminated, the need for better, higher efficiency air purification equipment becomes more pronounced, particularly in the more densely populated areas. Much of the air pollution in these populated regions is caused by automobile exhaust emissions and industrial plants that burn fossil fuel in order to satisfy their power demands. This type of pollution is difficult to cleanse from the air and cannot be effectively handled by conventional filters found in furnace and air conditioning systems. As a consequence, people who suffer from respiratory ailments are oftentimes forced to remain indoors when the air quality drops below a certain safe value. Ideally, while indoors, these people should breathe air that has been circulated through a high efficiency air purifying system. This type of system is typically costly and not easily transported from place to place. Inexpensive portable units are available however, the dependability and operability of these units is sometimes less than satisfactory.

Some air purification units, although portable, tend to be relatively heavy, while the housing containing the equipment on the other hand, is usually made of light-weight plastic and thus tends to be relatively weak. As a consequence, handles that are attached to the housing can easily fail at the point of attachment. Oftentimes the weight of the equipment stored within the housing is unequally distributed with relation to the carrying handle and, as a result, the unit becomes unbalanced when lifted by the handle. This unbalanced condition makes the unit difficult to carry from place to place and, under certain conditions, can pose a hazard to the person attempting to lift or carry the unit. Lastly, most exposed carrying handles are aesthetically unpleasing and destroy the lines of an otherwise attractive housing. Attempts to hide the handles within the housing have been less than successful because hidden handles again tend to be relatively weak and do not provide sufficient surface area to allow for a firm safe grip on the housing.

SUMMARY OF THE INVENTION

It is therefore an object of this invention to improve handles for lifting and carrying air handling equipment and, in particular, a portable air purifying unit.

It is a further object of the present invention to improve the aesthetic value of a portable air purifying unit.

It is a still further object of the present invention to provide a hidden handle for a portable air purifying unit that is strong and safe to use.

Another object of the present invention is to provide a hidden handle for a portable air purifying unit that is attached directly to the main support member of the unit so that the weight of the equipment is balanced with regard to the handle.

These and other objects of the present invention are attained by a hidden handle for a housing containing air purifying equipment. The components of the air purifying equipment are all mounted on a rectangular shaped main support member so that the weight of the equipment is well balanced upon the support. A top cover is secured to the top wall of the support and contains a raised partition that extends laterally across the top of the support. A generous hand-hold passes through the center of the partition and opens into a recessed chamber that is mounted in front of the raised partition. The hand-hold and the recessed chamber combine to form a handle that provides for safe and secure gripping of the unit. A rear cover is secured to the back of the support having mounting features that allow the unit to be hung upon a wall. A front access cover is removably mounted upon the support to fully enclose the equipment within the unit. The top of the front cover rests upon the top of the partition to substantially hide the handle from view when the unit is mounted against or upon a wall while still providing full access to the handle.

BRIEF DESCRIPTION OF THE DRAWINGS

For a better understanding of these and other objects of the present invention reference will be made to the following detailed description of the invention which is to be read in association with the following drawings, wherein.

DESCRIPTION OF THE INVENTION

Figure 1:
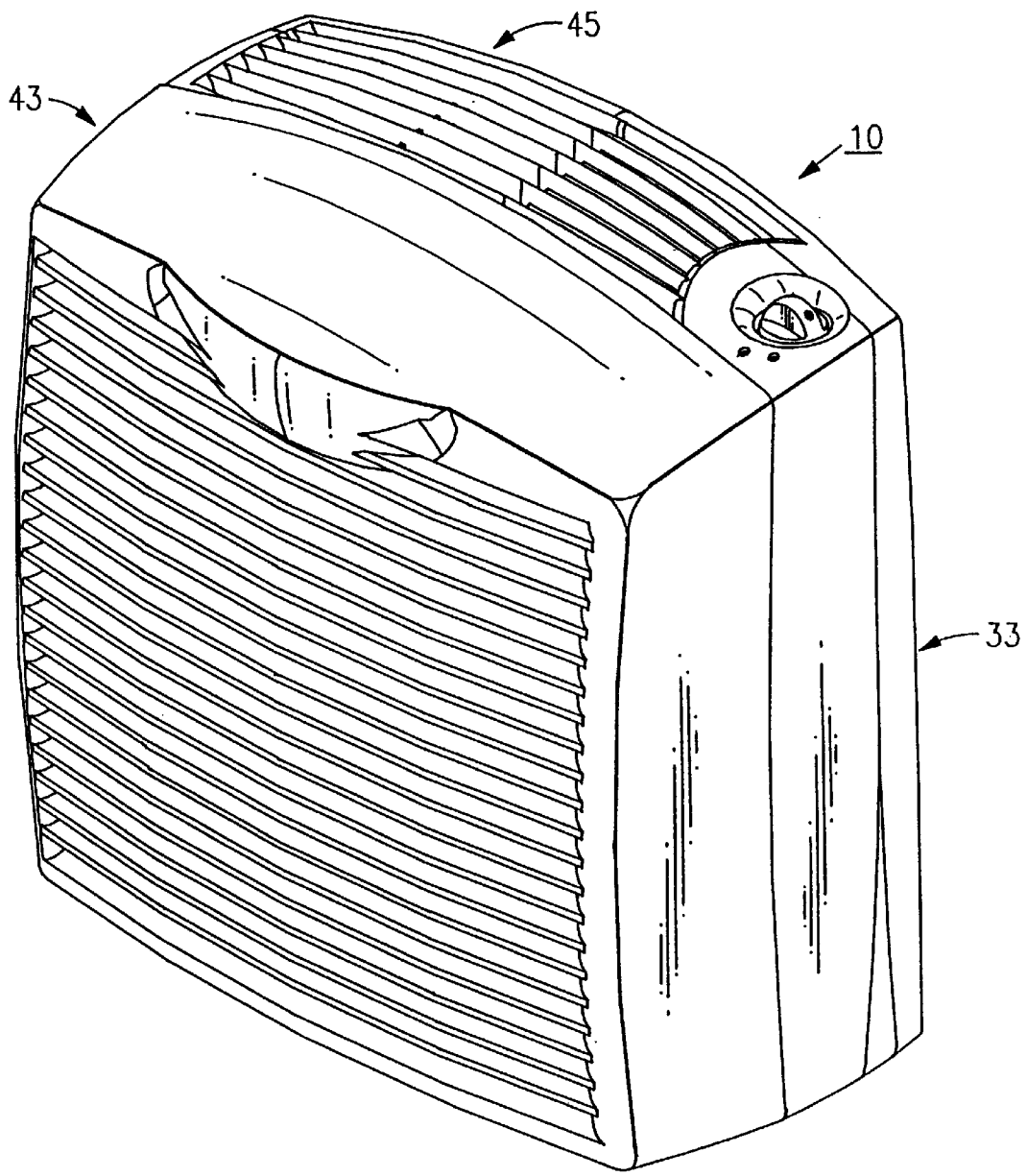
FIG. 1 is a perspective view of a housing for an air purifier unit embodying the teachings of the present invention.

Turning now to the drawings, there is shown a housing, generally referenced 10, enclosing an air purification unit. The housing contains a main support 12 upon which the components of the air purifier unit and the covers making up the unit housing are mounted. The main support member 12 is rectangular in form and includes a top wall 13 a bottom wall 14 and a pair of opposed side walls 15 and 16. The support also contains an internal wall 17 that is integral with the outer walls of the member. The support member is preferably molded from a high strength plastic.

A blower motor (not shown) is mounted in a bracket 21 located on the front face 22 of the internal wall of the support member. The motor shaft 23 passes through an orifice 25 formed in the interior wall of the member into a scroll 27 which is molded as part of the back face 28 of the support member. An impeller wheel or fan 30 is secured to the motor shaft and is fully contained within the scroll. A discharge opening 31 for the scroll is formed in the top wall of the support member. A rear cover 33 is secured to the support member by screws and contains a back panel 34 that closes against the back of the scroll and the discharge opening to establish an enclosed flow path through the back of the support member.

A recess 35 is provided in the top wall of the support system in which a circuit board 37 and other electrical components associated with the air purifier are mounted. An electrical service cord 38 is coupled to the electric components and is directed around the scroll by an open channel 39 and is brought out of the housing through an opening in the rear cover.

A filter frame 40 containing a high efficiency particle arrestor (HEPA) filter 41 is fitted to the front of the support member. A top cover 45 is securely attached by threaded fasteners 42 (FIG. 4) to the top wall of the support member and a front access cover 43 is removably connected to the front of the support member by a suitable latching mechanism to close the housing. The covers, in assembly, contain abutting edge surfaces that interlock at closure to establish tight seams that prevent air from escaping from the housing between the covers. Under the influence of the blower, air is drawn into the housing through the inlet vent 46 located in the front cover and is passed through the HEPA filter before being exhausted through a discharge vent 47 located in the top cover immediately over the scroll discharge opening. As should now be evident, the component parts of the blower system, the electrical components for operating the unit, and the housing covers are all mounted on the one main support member 12. The parts of the unit are balanced about the center of the support member.

The top cover contains a raised partition 49 (FIG. 4) that extends laterally across the entire cover and thus across the entire top of the support member. A hand hold 50 is centrally located in the partition. The hand hold passes through the partition and opens into a housing 51 that is mounted in front of the partition. The housing coacts with the hand hold to establish a generous handle 52 that has sufficient surface area to enable the handle to be safely and securely gripped, thus providing for safe, sure lifling and carrying of the unit. The top cover and the housing are integrally molded of high strength plastic along with a pair of pads 53—53 located on either side of the housing 51.

Figure 2:
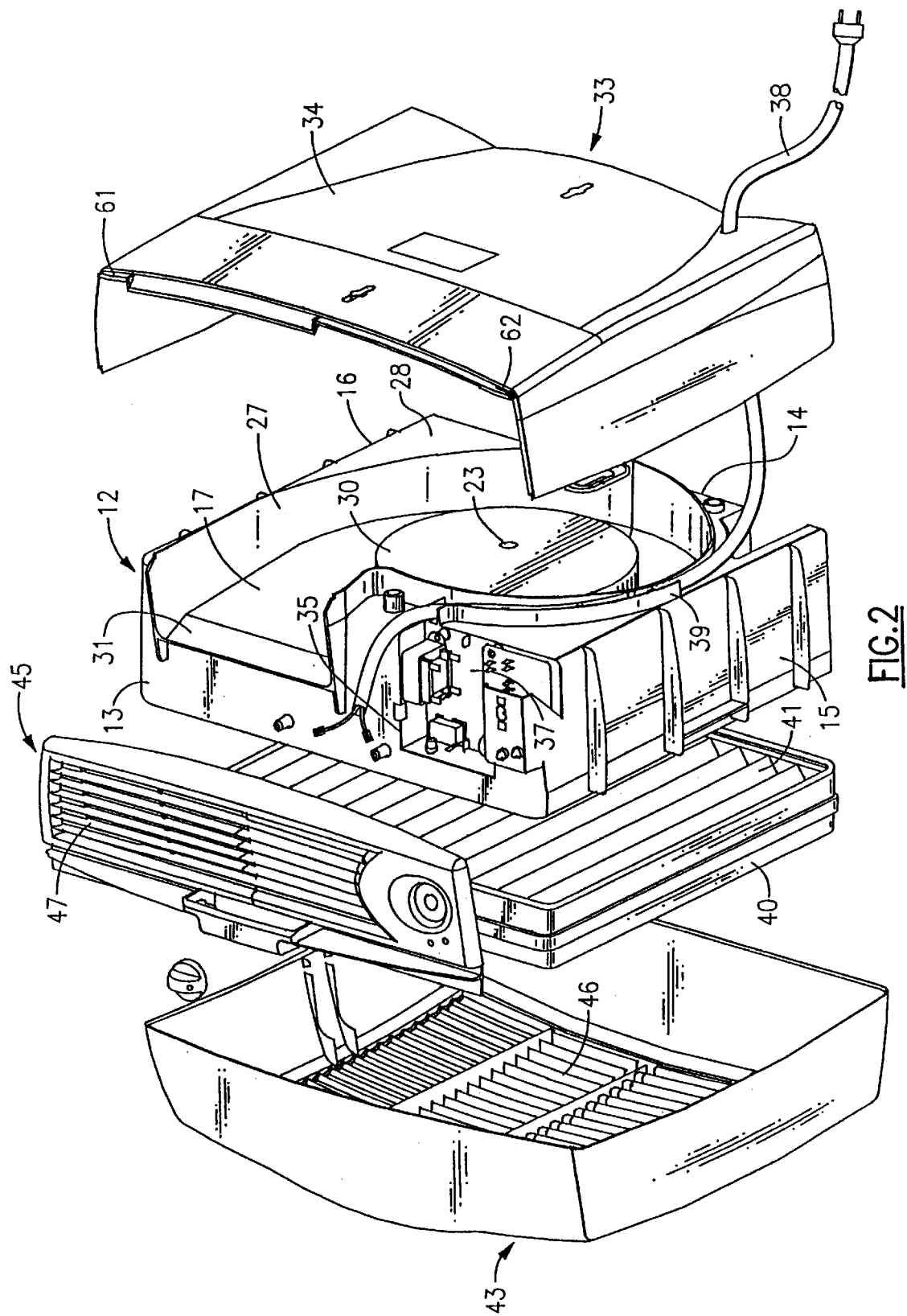
FIG. 2 is an exploded view in perspective showing the components of the housing and the air handling equipment mounted in the housing.
Figure 5:
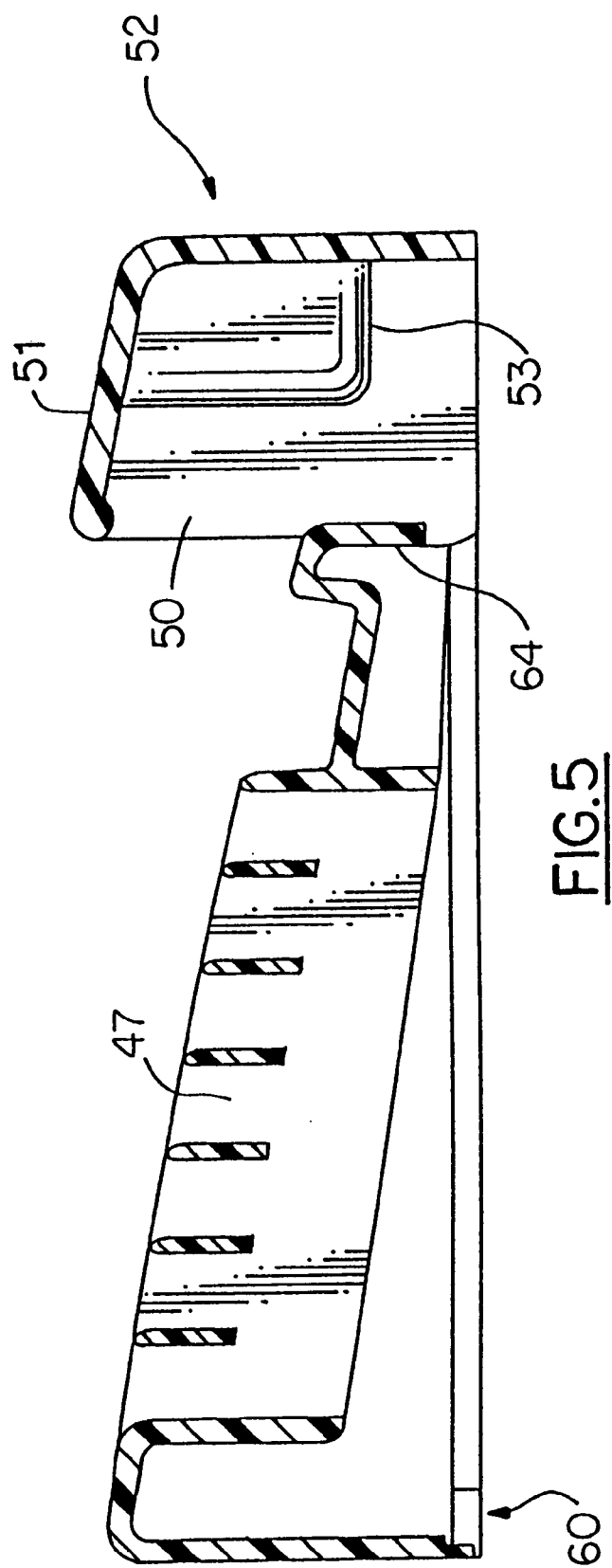
FIG. 5 is a section taken along line 5—5 in FIG. 4.

As best illustrated in FIG. 5, lips 60 are located inside the top cover at the two back corners of the cover. The lips are arranged to pass into recesses 61 and 62 located along the top edge of the rear cover's back panel 34 (FIG. 2). The top cover further includes a vertically disposed inside wall 64 that is arranged to close over a pair of tabs 65 on the top wall of the support member and also the front of the raised platform of the control area when the top cover is assembled on the main support member. As can best be seen, once the top cover is positioned on the top wall of the support member, it is prevented from moving forwardly or rearwardly on the support member.

Figure 4:
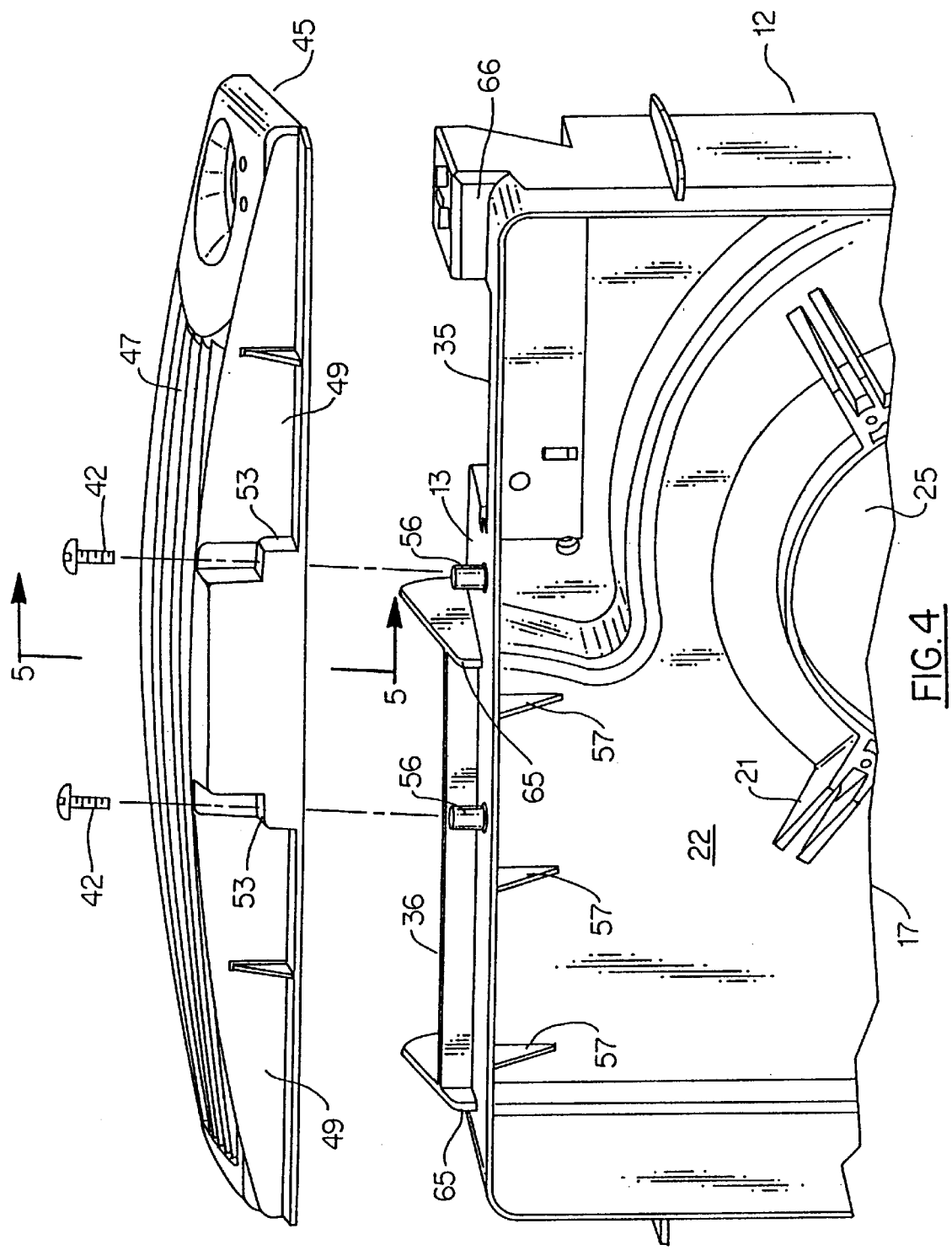
FIG. 4 is a partial exploded view in perspective showing the top cover and the top section of the main support member of the unit.

As best seen in FIG. 4 threaded fasteners 42 are arranged to pass through the pads and are threaded into screw bosses 56—56 molded into the top wall of the support member. When the screws are tightened down, the top cover is joined to the main support member of the housing. A series of gussets 57—57 are molded into the support member that extend between the interior wall 17 and top wall 13 of the support member. The gussets provide additional strength to the support member and help prevent the support member from becoming deformed when the unit is lifted by the handle. Accordingly, when the housing is lifted by the handle, the entire weight of the unit is suspended entirely from the support member. The handle is centrally located over the support member so that the weight of the unit is well balanced about the handle thereby allowing the unit to be easily and safely transported from place to place.

Figure 3:
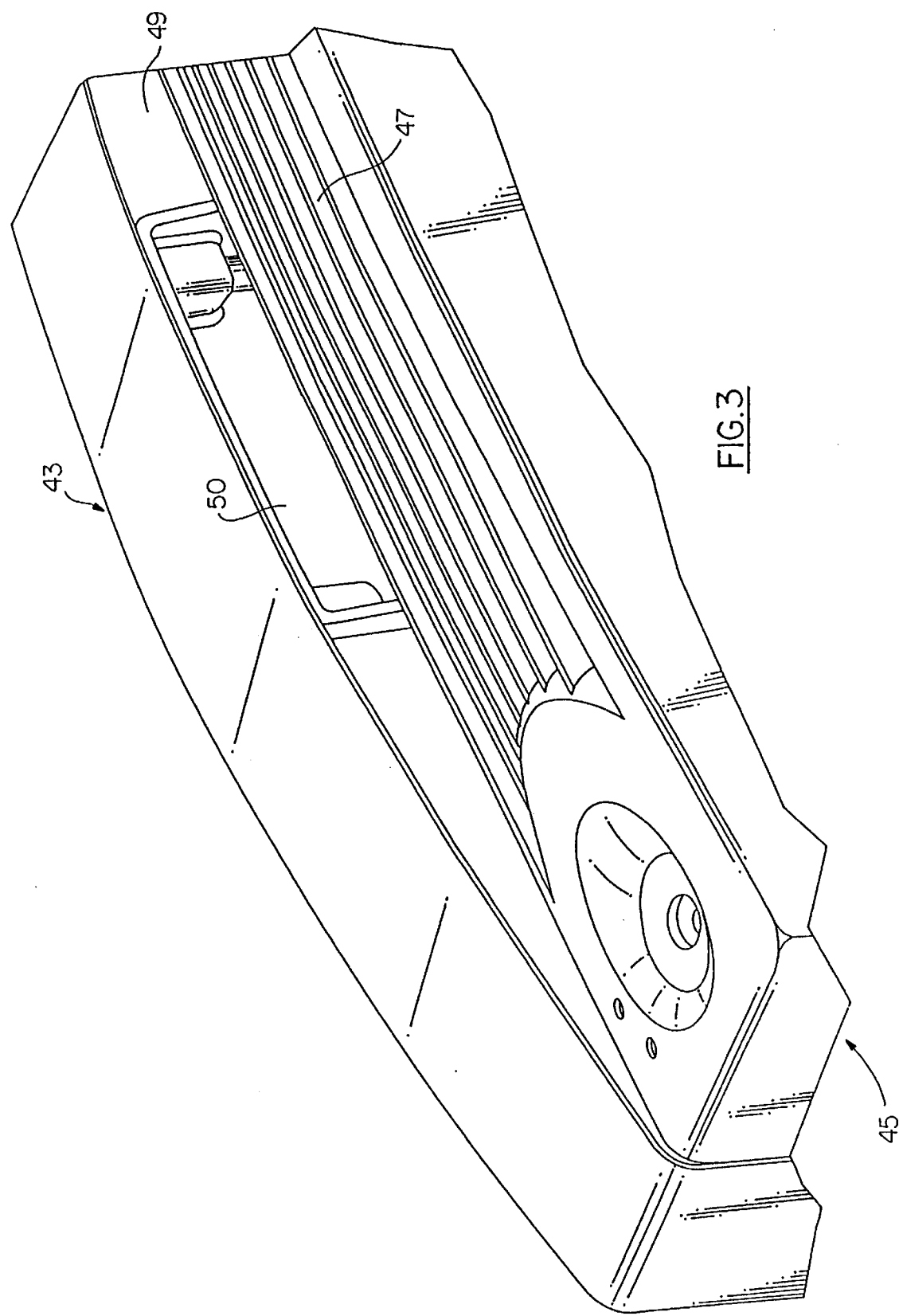
FIG. 3 is an enlarged partial view in perspective showing the top cover and the front cover of the housing in closure.

With further reference to FIGS. 3, 4 and 5, the top wall of the front access cover of the housing is arranged to close over the top of the raised partition 49 on the top cover thus hiding a major portion of the handle 52 from view while still allowing full hand access to the handle. This in turn preserves the clean lines of the housing while still providing all the benefits of a high strength well balanced lifting and carrying device.

While this invention has been explained with reference to the structure disclosed herein, it is not confined to the details set forth and this invention is intended to cover any modifications and changes as may come within the scope of the following claims:

What is claimed is:

1. Apparatus for lifting and carrying an air purifying unit that includes:
   a rectangular-shaped main support member having a top wall, a bottom wall, and two opposed side walls integrally joined by an internal wall;
   mounting means for supporting the component parts of the air purification unit upon said main support member so that the weight of the component parts is substantially balanced about the center of the main support member;
   cover means attached to the main support member forming a housing for completely enclosing the main support member and the air purifying unit inside said housing, said housing including a top cover, a rear cover, and a front cover;
   said top cover being securely attached to the top wall of said support member and having a raised lifting handle centered over the main support member, said top cover further including fastening means for securing said top cover to said main support, member said fastening means providing support so that said unit can be carried solved by said handle without separating said top cover from said unit; and
   said front cover having a top wall that passes over the handle to partially shield the handle beneath said front cover.

2. The apparatus of claim 1, wherein said top cover further includes a raised partition extending laterally across the top wall of the support member, said partition having a centrally located hand-hold passing therethrough and an enclosure mounted in front of said partition into which the hand-hold opens, said hand-hold and said enclosure combining to form said handle.

3. The apparatus of claim 2 that further includes a pad mounted in said top cover on either side of said handle and screw means passing through said pads into said support member for securing the top cover to the support member.

4. The apparatus of claim 3 that further includes gusset means acting between the internal wall and the top wall of said support member to provide additional strength to said support member.

5. The apparatus of claim 1, wherein said top cover and said support member are molded of a high strength plastic.

6. The apparatus of claim 2, wherein said top cover is coextensive with the top wall of the support member.

7. Apparatus for lifting and carrying an air purifying unit that includes
   a rectangular shaped main support frame having a top wall, a bottom wall, two opposed side walls and a central wall integrally joined to the other walls about midway between the front and the back of the main support frame,
   said central wall having an orifice passing therethrough between a front face of said central wall and a rear face,
   a fan motor mounted on the front face of said central wall with the motor shaft passing rearwardly through said orifice and a fan mounted upon the motor shaft adjacent the back face of said central wall,
   enclosing means secured to the main support frame for completely enclosing the main support means within said enclosing means, and
   said enclosing means further including a top cover that is secured to said top wall of the main support frame, said top cover having a raised handle centrally mounted thereon whereby the air purifying unit can be safely lifted and carried in a balanced condition.

8. The apparatus of claim 7 wherein said top cover contains a raised partition that extends laterally across said top cover, said partition containing a hand hold centrally located therein that has an entry opening that passes forwardly through a rear surface of said partition and a front cover for enclosing the front of said main support frame which closes over the front of said partition.

9. The apparatus of claim 8 wherein said top cover and said partition are integrally moulded from high strength plastic.

10. The apparatus of claim 8 wherein said top cover is secured to the top wall of said main support frame by threaded fasteners which are located in front of said raised partition whereby said fasteners are enclosed beneath said front cover.

* * * * *